United States Patent [19]

Rappart et al.

[11] Patent Number: 4,819,482
[45] Date of Patent: Apr. 11, 1989

[54] DEVICE FOR CONNECTING AND SUPPORTING A WATER-METER

[75] Inventors: Alain Rappart, Lalbenque; Henri Loosdregt, Paris; Paul Persohn, Prechac; Philippe Persohn, Bazas, all of France

[73] Assignees: Manufacture d'Appareillage Electrique de Cahors, Cahors; Lyonnaise des Eaux, Paris; Persohn S.A., Bazas, all of France

[21] Appl. No.: 170,683

[22] Filed: Mar. 14, 1988

[30] Foreign Application Priority Data

Mar. 13, 1987 [FR] France ................. 87 03453

[51] Int. Cl.$^4$ ............................................. G01F 15/18
[52] U.S. Cl. ........................................ 73/201; 73/273; 251/149.9
[58] Field of Search .................... 73/198, 201, 273; 251/89.5, 149.9

[56] References Cited

U.S. PATENT DOCUMENTS 910,514   1/1909  Dilts .................................. 73/201 X
3,731,534 5/1973  Painley et al. .

FOREIGN PATENT DOCUMENTS 0116005  8/1984  European Pat. Off. .
0210933  2/1987  European Pat. Off. .
2461235  1/1981  France .
327420   3/1958  Switzerland .
345750   5/1960  Switzerland .
772158   4/1957  United Kingdom .

Primary Examiner—Herbert Goldstein
Attorney, Agent, or Firm—Young & Thompson

[57] ABSTRACT

The device for connecting and supporting a water-meter (1) comprises a water-inlet pipe (2) and a water-outlet pipe (3) secured in a support (8). The support comprises a stationary seat (9) in which are mounted the water-inlet pipe (2) and the water-outlet pipe (3). The seat carries a plate (10) comprising two conduits (11, 12) designed to be connected to inlet (4) and outlet (5)-apertures on the meter (1). The plate (10) is mounted to rotate upon seat (9) about an axis (X-X') for the purpose of opening up or shutting off the flow of water, or for testing the meter.

27 Claims, 5 Drawing Sheets

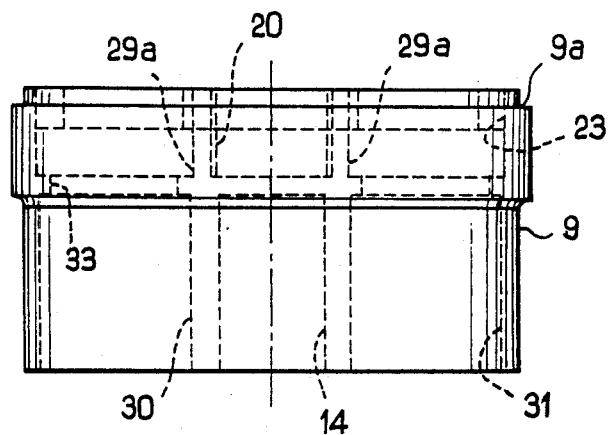
FIG_7
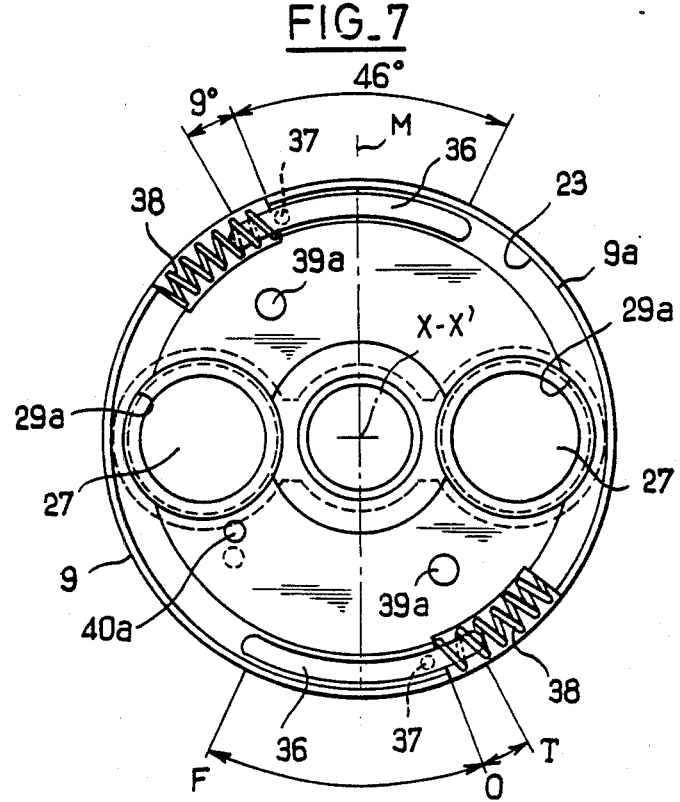
FIG_8

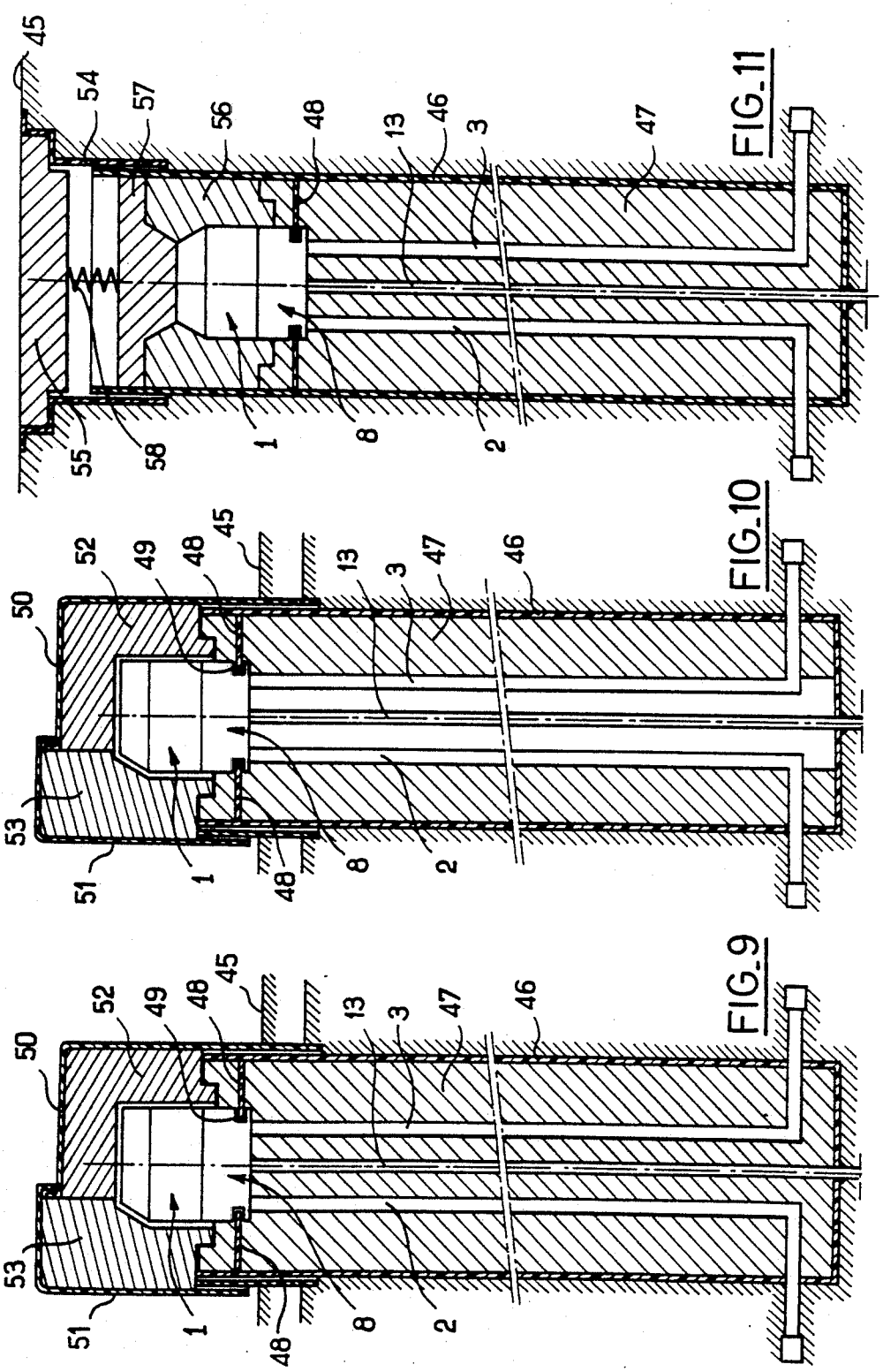

DEVICE FOR CONNECTING AND SUPPORTING A WATER-METER

FIELD OF THE INVENTION

The present invention relates to a device for connecting and supporting a water-meter comprising a water-inlet and a water-outlet pipes, the said pipes being connected to the meter by means for opening up, shutting off or diverting the flow of water.

DESCRIPTION OF THE PRIOR ART

Known designs of water-meters are equipped, at their opposite ends located on a horizontal line, with a stop-cock connected to a water-inlet and a water-outlet pipes buried to a certain depth in the ground.

These installations are located in pits dug into the ground and wide enough to access the meter and accessories thereof such as stop-cocks.

Bearing in mind the width of these pits, they are expensive to dig and cannot be located in the public domain.

Furthermore, the said installations pose a delicate problem as regards protection against frost. Thus, in order to prevent water from freezing in the water-inlet and -outlet pipes, the said pipes must be buried deeply in the ground, which increases the cost and makes the water-meter difficult of access.

In an effort to overcome this problem, European Patent 0 116 005 describes a device which makes it possible to keep the water-inlet and -outlet pipes connected to the meter at a temperature above 0° C. This device comprises heat pipes or caloducs arranged in a condition of heat exchange with the water-inlet and -outlet pipes, the said heat pipes or caloducs being buried in the ground whence they derive the necessary heat.

This design is relatively costly and repairs are difficult. Moreover, it fails to solve the problem of excessive pit-width resulting from the use of a meter having its water-inlet and -outlet arranged upon a horizontal line.

The purpose of the invention is to overcome the disadvantages of known designs by providing a device for connecting and supporting a water-meter, which will be compact, easily accessible, will need only a relatively small pit, can be located in the public domain, and may easily be protected against frost.

SUMMARY OF THE INVENTION

The device, according to the invention, for connecting and supporting a water-meter comprises a water-inlet and a water-outlet pipes, the said pipes being connected to the meter by means for opening up, shutting off or diverting the flow of water.

According to the invention, this device is characterized in that the water-meter comprises a water-inlet and a water-outlet apertures arranged side by side on a face designed to be connected to a support of the said meter, the said support comprising a stationary seat wherein a water-inlet and a water-outlet pipes are mounted substantially in parallel with each other; in that this seat is surmounted by a plate comprising two water-conduits designed to be connected respectively to the meter-inlet and outlet apertures, the said plate being mounted to rotate on the said seat about an axis which is substantially vertical and passes between the two pipes, between a position in which the water-conduits, arranged in the plate, are located in the axis of the water-inlet and water-outlet pipes, and a position in which the said water-conduits are offset angularly in relation to the water-inlet and -outlet pipes in such a manner as to shut off the flow of water between the pipes, the said meter serving as a holding means for controlling the water-circuit.

Thus, in order to shut off the flow of water to the meter, it suffices to rotate, about a vertical axis, the assembly consisting of the meter secured to the plate in relation to the fixed seat. The meter thus serves as a holding means for controlling the shut-off and opening up of water.

Since the means for shutting off the incoming water are arranged under the meter and are integral with the plate and the seat which carries its own water-inlet and -outlet tubes, the said assembly is very compact and of reduced width. This reduces very considerably the cost of the pit to be dug in order to contain it.

According to an advantageous variant of the invention, the plate comprises, in the axis of its rotation, a bore carrying a sleeve, the end of which adjacent to the face of the plate carries an annular shoulder bearing against a complementary shoulder arranged in the bore in the plate, an internal thread, adapted to accomodate a plug, larger in diameter than the bore in the sleeve, and the other end of this sleeve being screwed into an internal thread arranged in the seat.

According to a preferred version of the invention, the seat comprises, in the lower extension of the axis of rotation of the plate, a bore to which is fitted a sheath tube designed to be buried in the ground and to accomodate a heat pipe or caloduc which is introduced into the sleeve after removal of the plug.

According to another configuration of the invention, the cavity extending from the lower end of the sheath tube to the lower face of the plug contains a heat pipe or caloduc-tube, the lower end of which is in a condition of heat-exchange with the ground, while the upper end is in a condition of heat-exchange with the seat, the sleeve, the plate, and the plug which caps it and permits its replacement.

The plug preferably also creates a thermal link between the end of the heat pipe or caloduc and the face of the meter comprising the water-inlet and -outlet apertures.

These provisions provide easy installation of the heat pipe or caloduc and excellent conditions of heatexchange between it, the seat, and the plate. Furthermore, the sleeve also acts as a pivot to guide the rotation of the plate, as a means of securing the latter to the seat, and as a means of transmitting the heat between the heat pipe or caloduc and the plate.

As a result of these arrangements, the meter may be located above ground, which facilitates access thereto and reduces installation costs.

Other characteristics and advantages of the invention may be gathered from the following description.

BRIEF DESCRIPTION OF THE DRAWINGS

In the drawings attached hereto, and given as non-restrictive examples of the invention:

FIG. 7 is a side elevation view of the seat;

FIG. 8 is a top plan view of the seat;

FIG. 9 is a longitudinal sectional view showing the meter and its support secured to the ground in a serviceable position;

FIG. 10 is a view, similar to that in FIG. 9, of a variant of the invention;

FIG. 11 is a view, similar to that in FIGS. 9 and 10, of another variant.

DESCRIPTION OF THE PREFERRED EMBODIMENT

Figure 1:
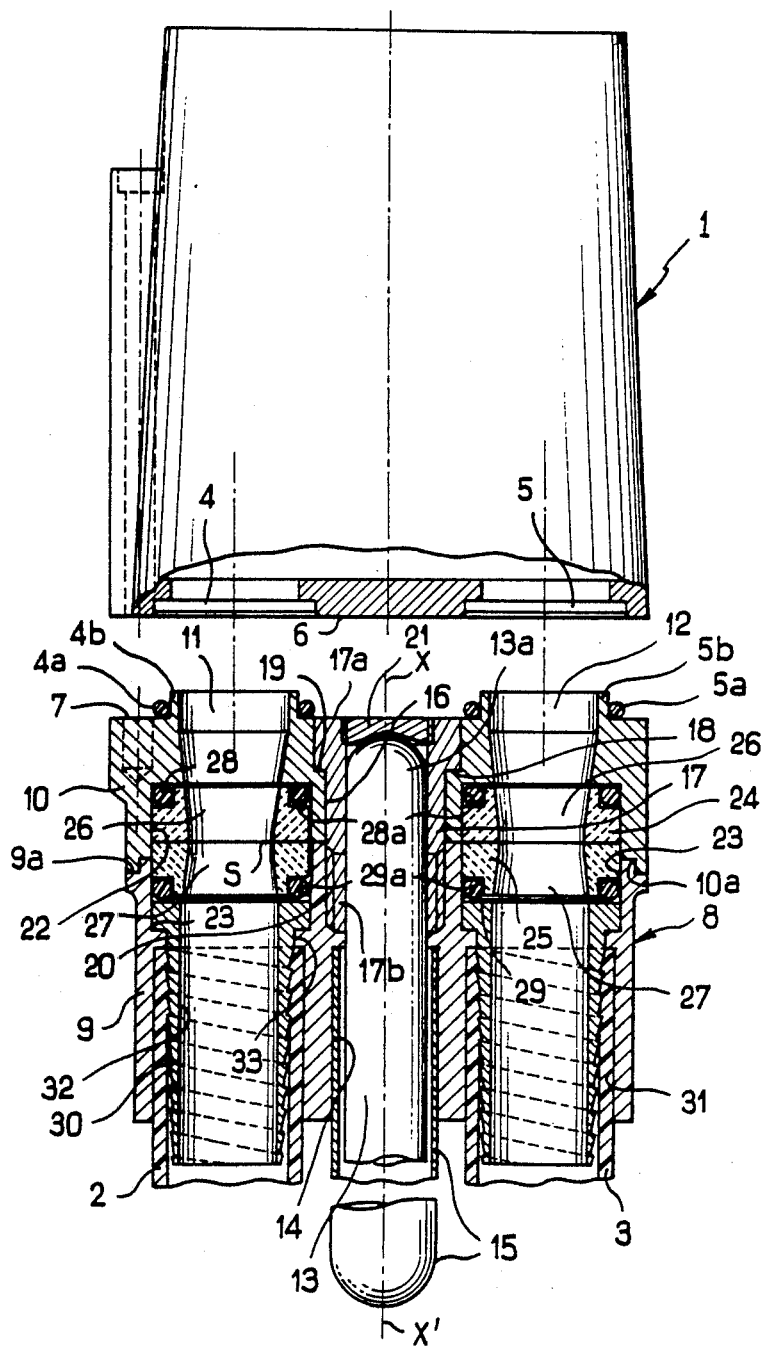
FIG. 1 is a side elevation and partial londitudinal sectional view of the meter and a longitudinal sectional view of the plate and of the seat carrying the water-inlet and -outlet pipes.
Figure 2:
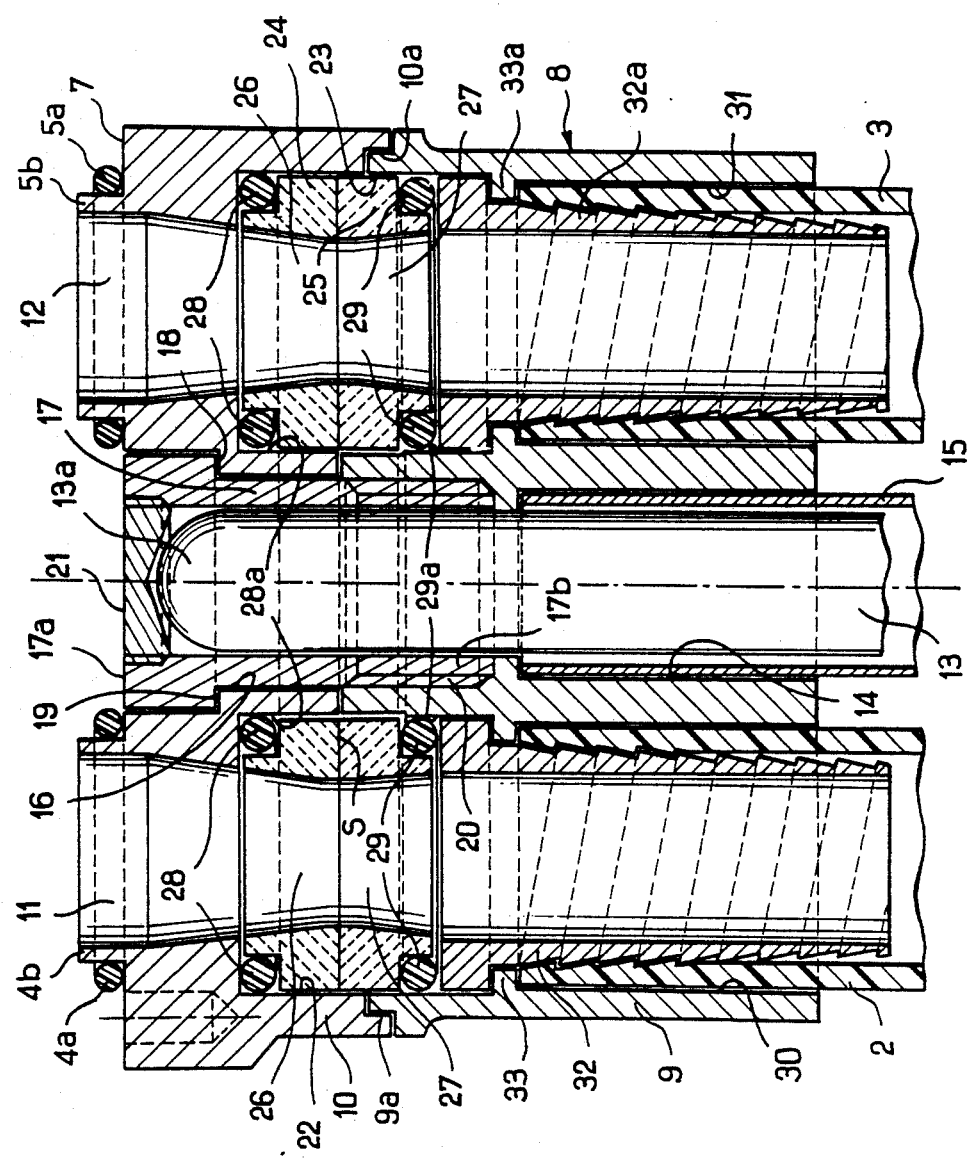
FIG. 2 is an enlarged longitudinal sectional view of the plate.

In the example according to FIGS. 1 and 2, the device for connecting and supporting a water-meter 1 comprises a water-inlet pipe 2 and a water-outlet pipe 3 designed to be connected to the meter by means for opening up, shutting off or diverting the flow of water.

Water-meter 1 comprises a water inlet-aperture 4 and a water outlet-aperture 5 arranged side by side on a planar face 6 designed to be fitted, by means of bolts (not shown) integral with seat 9, to upper surface 7 of support 8 of meter 1.

This support 8 comprises a stationary seat 9 wherein a water-inlet pipe 2 and a water-outlet pipe 3 are mounted substantially in parallel with each other. This seat 9 is surmounted by a plate 10 comprising two conduits 11, 12 projecting at 4b, 5b from surface 7 and designed to position meter 1 and to position and compress flexible gaskets 4a, 5a in shouldered orifices 4, 5 of face 6 of the said meter, and to carry calories from plate 10 to a meter 1.

Plate 10 is mounted to rotate on seat 9 about an axis X-X', which is substantially vertical and passes between pipes 2, 3, between a position (as indicated in FIGS. 1 and 2) in which water conduits 11, 12, arranged in plate 10, are located in the axes of water-inlet 2 and water-outlet 3 pipes, and a position in which the said water-conduits are offset angularly in relation to water-inlet 2 and water-outlet 3 pipes in such a manner as to shut off the flow of water between the said pipes and meter 1.

Located between water-inlet 2 and water outlet- 3 pipes is a sheath 15 designed to accomodate heat pipe or caloduc 13 and to be buried to a certain depth (for example 2 metres) in the ground. The upper end of heat pipe or caloduc 13 is in a condition of heat-exchange with seat 9 carrying water-inlet 2 and water-outlet 3 pipes and with rotating plate 10.

In the example illustrated in figures 1 and 2, seat 9 comprises, in the lower extension of axis X-X' of plate 10, a bore 14 within which is fitted a sleeve 15 which surrounds heat pipe or caloduc 13.

Plate 10 also comprises, in its axis X-X' of rotation, a bore 16 in which is mounted a sleeve 17, the end of which adjecent to plate 10 carries an annular shoulder 18 bearing against a complementary shoulder 19 arranged in bore 16 in the plate. The other end 17b of sleeve 17 is screwed into an internal thread arranged in seat 9. Sleeve 17 surrounds, substantially without play, end 13a of heat pipe or caloduc 13, allowing the latter to be in a condition of heat-exchange with seat 9 and plate 10, the said sleeve also acting as a pivot for the rotation of plate 10. Lower surface 10a of the plate, and upper surface 9a of seat 9, are conformed with peripheral grooves and a small amount of play is arranged between them.

Furthermore, end 17a of sleeve 17 adjacent to plate 10 is closed off by a plug 21 in contact with end 13a of the heat pipe or caloduc. Plug 21 is designed to make contact with face 6 of meter 1 comprising water-inlet 4 and -outlet 5 apertures, in such a manner that the said heat pipe or caloduc 13 is in a condition of heat-exchange with the meter, and to provide a passage for the installation or removal of the heat pipe or caloduc 13.

Surface 10a of plate 10 adjacent to seat 9, and surface 9a of the latter adjacent to plate 10, each comprise an annular recess 22, 23 accomodating an inoxidizable ring 24, 25. Each recess 22, 23 comprises two diametrically opposite circular recesses 28a, 29a in which are mounted flexible gaskets 28, 29 accommodating tubular projections 28b, 29b on rings 24, 25. This arrangement has the advantage of allowing rings 24, 25 to be put in rotation with plate 10 and seat 9.

Rings 24, 25 (see also FIGS. 4, 5, 6) each comprise two equal passages 26, 27 located respectively in the extension of conduits 11, 12 in plate 10 of pipes 2, 3 carried by seat 9. Furthermore, the said rings bear against each other along a flat surface S.

Figure 4:
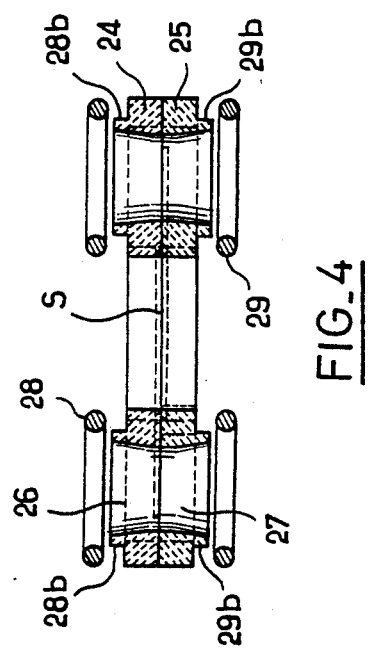
FIG. 4 is a diametrical cross-sectional view of the two alumina rings with their seals.

These two rings 24, 25 are preferably made of alumina, a material which is inoxidizable and has the advantage of being able to be machined in such a manner that the flat contacting surface S between the two rings is a perfect seal. Passages 26, 27, arranged in rings 24, 25, are preferably in the form of convergent-divergent truncated cones, as shown in FIGS. 2 and 4.

Figure 5:
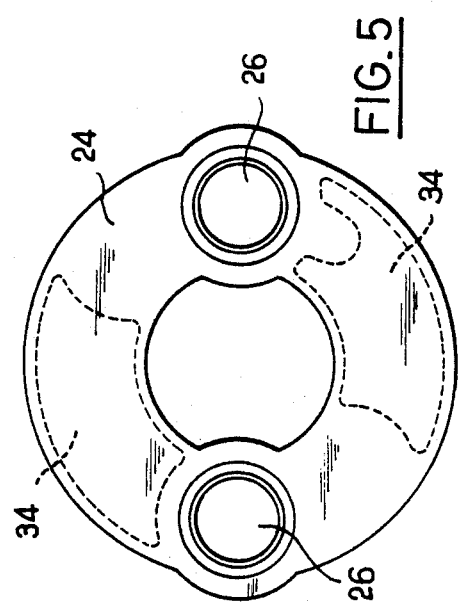
FIG. 5 is a top plan view of the upper alumina ring.
Figure 6:
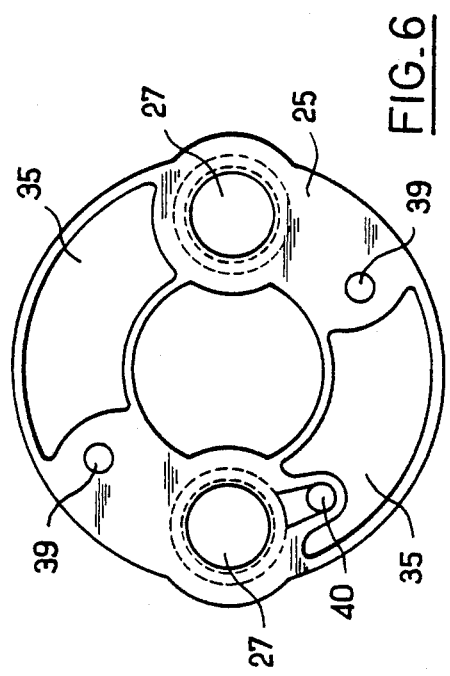
FIG. 6 is a top plan view of the lower alumina ring.

On the other hand, it may be seen in FIGS. 5 and 6 that the flat surfaces of rings 24, 25 designed to bear against each other along surface S, comprise two diametrical recesses 34, 35 filled with grease for the purpose of lubricating contact surface S when plate 10 is rotating.

Moreover, as shown in FIGS. 1 and 2, rings 24, 25 are sealed in their circular recesses 28a, 29a by means of resilient annular gaskets 28, 29 made of rubber for example.

Water-inlet 2 and water-outlet 3 pipes are preferably made of a plastic such as polyethylene. The said pipes are mounted in bores 30, 31 made in seat 9. The walls of pipes 2, 3 are pressed against corresponding bores 30, 31 by hollow conical screws 32, 32a engaging in recess 29a in the surface of seat 9 adjacent plate 10.

Bores 30, 31 in pipes 2, 3 are separated from corresponding recess 29a by a shoulder 33, 33a against which the heads of screws 32, 32a and the ends of pipes 2, 3 bear. The hole in each screw 32, 32a is shaped in such a manner as to be able to be gripped by a tool adapted to its internal shape.

Figure 3:
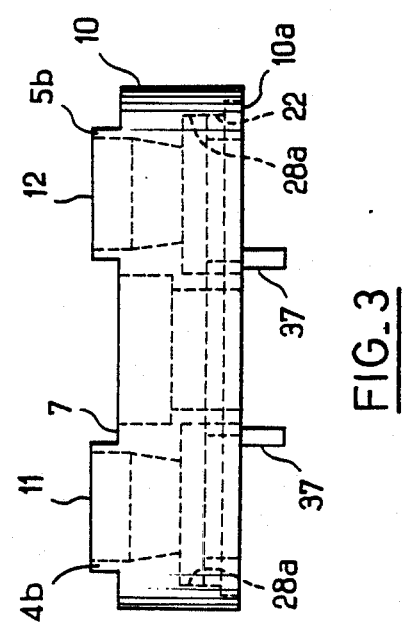
FIG. 3 is a side elevation view of the plate.

As shown in FIG. 8, seat 9 comprises, on its face 9a adjacent to plate 10, two diametrically opposed arcuate grooves 36 in which two pins 37 (see FIG. 3), projecting from face 10a of plate 10 adjacent seat 9, move.

Grooves 36 run substantially on each side of a plane M perpendicular to the plane in which the axes of pipes 2, 3 are located.

Each groove 36 passes under a spring 38 in a path according to a small angle of 9° for example. Each spring 38 is itself pre-stressed in a groove not as deep as grooves 36. Pins 37 in plate 10 cannot therefore remain stable in the area of movement of springs 38.

The positions occupied by pins 37, in the open and closed condition, are marked O and F respectively in FIG. 8. In closed position F, conduits 11, 12 are offset at 46° in relation to pipes 2, 3 and face orifices 39 in ring 25 and 39a in seat 9.

In this position, the water in the meter drains away.

It will be seen in FIGS. 8 and 6 that seat 9 and ring 25 also comprise, in the vicinity of water-outlet passage 27, small passage openings 40a and 40 which communicate, when springs 38 are pushed to the maximum, with conduit 12, thus creating a small leak of water used to ensure that meter 1 is operating satisfactorily. When meter 1 is released, springs 38 automatically move pins 37, and therefore plate 10, into the fully open position. This leak between water-outlet orifice 12 and the exterior of the seat, water-inlet orifice 26 in ring 24 being partly opposite water-inlet orifice 27 in ring 25, is obtained when orifice 40 is in a position such that the distance separating it from water-outlet orifice 27 in ring 25 is, at the most, equal to the diameter of orifice 27.

The assembly consisting of meter 1 sealed to plate 10, which is in turn mounted to rotate upon seat 9, may be placed in a cylindrical envelope having a substantially vertical axis and at least partly buried in the ground, seat 9 and sheath 15 being made integral with this envelope.

The device described hereinbefore operates as follows:

In order to shut off the water entering meter 1, all that is needed is to rotate it through 46° about axis X-X' in such a manner that pins 37 on plate 10 move between positions O and F.

The main advantages of this design are as follows:

Since the water passages are in alignment with two vertical axes spaced slightly apart from each other, since the shut-off means are arranged along these two axes, and since the opening and closing controls of said means are actuated by rotating the meter about an axis passing between the two aforesaid axes, the device as a whole is not very wide. For example, the distance between the axes of pipes 2, 3 may be reduced to 54 mm.

The device may therefore be located in a cylindrical pit the diameter of which does not exceed 200 mm. Moreover, the arrangement of the two water-passages, and of the shut-off means, along two parallel axes, makes it possible to insert between them a heat pipe or caloduc 13, the end of which is capped by a sleeve acting as a pivot for the rotation of meter 1 and plate 10. This arrangement of the heat pipe or caloduc permits optimal heat-exchange with the assembly of support 8, including meter 1 itself. This eliminates any danger of freezing of the water located within support 8 and meter 1.

As a result of this excellent protection against frost, the meter-support, and the meter itself, instead of being buried in the ground, may be located above the pit.

In the example illustrated in FIG. 9, meter 1 and support 8 are located above the level of the ground 45. Inlet-and outlet-pipes 2 and 3, heat pipe or caloduc 13, and meter-support 8 are surrounded by a cylindrical enveloppe 46, made of plastic, for example, and buried in a pit dug in the ground. Pipes 2, 3 and heat pipe or caloduc 13 are surrounded by a protective lining made of an insulating material. Meter-support 8 is made integral with external envelope 46 by ribs 48 engaging in recesses 49 in support 8. This prevents the support from turning when meter 1 is rotated about its vertical axis.

Meter 1, located above the level of ground 45, is covered by a plastic box 50, the base of which is buried in the ground. This box comprises a lateral door 51 providing access to meter 1. Arranged within box 50 are two blocks 52, 53, made of an insulating material such as expanded polystyrene, which protect the meter against freezing. The said blocks are detachable. Block 53, adjacent door 51, may be removed, after the door has been opened, to allow the meter to be read or to be rotated in order to shut off incoming water.

This arrangement, allowing the meter to be located 1 m above the ground, provides easy access to the meter while providing excellent protection against freezing. Furthermore, since external envelope 46 is of reduced diameter, for the reasons explained hereinbefore, the pit needed to bury this envelope is not very costly.

FIG. 10 illustrates an embodiment identical with that in FIG. 9 except that the insulating material between heat pipe or caloduc 13 and pipes 2, 3 has been eliminated.

In the embodiment illustrated in FIG. 11, meter 1 and support 8 are arranged below the level of ground 45 in an inspection-hole 54 closed off by a plug 55. Water-inlet 2 and-outlet 3 pipes, heat pipe or caloduc 13, support 8, and meter 1 are surrounded by a cylindrical envelope 46 enclosing a lining made of an insulating material 47. As in the previous example, meter-support 8 is made integral with external envelope 46 by ribs 48. Meter 1 is enclosed in a block 56 of insulating material which may be removed from enveloppe 46. This block 56 is covered by another block 57 which is detachable, is made of an insulating material, and is connected to plug 55 by a link 58. This arrangement also provdes easy access to meter 1.

In is to be understood that the invention is not restricted to the example of embodiment described hereinbefore. Instead, numerous modifications may be applied thereto without departing from the scope of the invention.

We claim:

1. A water meter assembly including a device for connecting and supporting said water-meter, said assembly comprising a water-meter (1), a water-inlet pipe (2) and water-outlet pipe (3), said water-meter including a water-inlet (4) and a water-outlet (5) each having apertures arranged in a side-by-side relationship upon a face of said water-meter, said water-meter being supported by support means (8) for said water-meter, said support means (8) comprising a stationary seat (9) upon which are mounted in substantially parallel relationship said water-inlet pipe (2) and said water-outlet pipe (3), said seat (9) having mounted thereupon plate (10) including two water conduits (11, 12) connected to water-inlet j(4) and water-outlet (5), respectively, said plate (10) being rotatably mounted on said seat (9) about an axis (X-X') which axis is parallel to and passes between said water inlet and outlet pipes (2, 3), said plate (10) being rotatable between a position in which said water-conduits (11, 12) permit communication between said water-inlet and outlet pipes (2, 3) and said water-inlet and outlet (4, 5), respectively, and a position in which said water conduits are offset angularly with regard to said water-inlet and outlet pipes (2, 3) so as to prohibit such communication and shut off the flow of water between said pipes and said water meter.

2. The assembly of claim 1, wherein said plate (10) comprises, along its axis of rotation, a bore (16) defined at least in part by an annular sleeve (17) through which said bore extends, said sleeve having an end adjacent a surface of said plate.

3. The assembly of claim 2, wherein said plate (10) further includes a bore within which said sleeve is seated, and said sleeve (17) further includes cap means threadedly attached to said end of said sleeve to close an end of said sleeve.

4. The assembly of claim 3, wherein said sleeve (17) is threadedly attached to said plate (10) within said bore of said plate.

5. The assembly of claim 1, wherein said seat (9) includes a bore (14) along said axis of rotation of said plate (10) into which is inserted a sheath tube (15), at least a portion of said sheath tube (15) extending into the ground beneath said water-meter, and further including a heat pipe (13) disposed within said sheath tube (15).

6. The assembly of claim 5, wherein one end of said heat pipe (13) is in heat exchange relationship with the ground within which said sheath tube (15) extends, while another end of said heat pipe (13) is in heat exchange relationship with said plate (10).

7. The assembly of claim 3, wherein said cap means is in a heat exchange relationship with said water-meter.

8. The assembly of claim 1, wherein said plate (10) and said seat (9) including facing surfaces at least a portion of which are comprised of non-oxidizable material.

9. The assembly of claim 8, wherein said facing surfaces are ring-shaped in configuration and include centrally-disposed openings (26, 27) which permit communication between said water inlet and outlet pipes (2, 3) and said water conduits (11, 12).

10. The assembly of claim 9, wherein said ring-shaped surface in said seat (9) includes at least one orifice (39) adapted to permit removal of water from said water-meter when said water supply is shut-off by rotation of said plate (10), said seat (9) further including orifice means (40, 40a) adjacent said opening (27) to permit water to pass from said opening (27) through said seat (9) when said plate (10) is rotated to its maximum extent.

11. The assembly of claim 8, wherein said non-oxidizable material comprises alumina.

12. The assembly of claim 9, wherein said centrally-disposed openings (26, 27) are in the form of outwardly diverging-inwardly converging passages.

13. The assembly of claim 9, wherein said facing surfaces of non-oxidizable material comprise ring-shaped elements which are seated in circular recesses in each said plate (10) and seat (9).

14. The assembly of claim 13, further including resilient O-rings in said recesses to assist in sealing said ring-shaped elements within said recesses.

15. The assembly of claim 1, wherein said seat (9) includes bores within which are seated said water-inlet and outlet pipes (2, 3).

16. The assembly of claim 15, wherein said water-inlet and outlet pipes (2, 3) are comprised of a plastic material.

17. The assembly of claim 15, further including two tubular members extending from said seat (9) within said bores, said tubular members having respective bores which are aligned with said centrally-disposed openings (26, 27) each tubular member having annular ridges extending from an exterior surface thereof.

18. The assembly of claim 17, wherein said annular ridges comprise external screw threads.

19. The assembly of claim 17, wherein said water-inlet and outlet pipes (2, 3) are seated upon said tubular members.

20. The assembly of claim 19, wherein said water-inlet and outlet pipes (2, 3) are seated against and abut respective shoulders extending laterally from said seat (9) within said bores.

21. The assembly of claim 1, further including means to limit the extent said plate (10) may be rotated with respect to said adjacent seat (9).

22. The assembly of claim 21, wherein said means to limit the extent of rotation of said plate (10) comprises arcuate grooves within said seat (9) which grooves cooperatively engage pin-like extensions on said plate (10) with said pins traveling along an arcuate path defined by said arcuate grooves as said plate (10) is caused to rotate.

23. The assembly of claim 22, further including spring bias means which engage said pins as said pins travel along said arcuate path.

24. The assembly of claim 1, wherein said plate (10) includes two annular extensions extending from said two water conduits (11, 12) and configured to cooperatively engage said water inlet and outlets (4, 5) on said water meter.

25. The assembly of claim 1, further including insulating means surrounding said assembly and extending to said ground.

26. The assembly of claim 25, further including means to enclose said insulated assembly, said means to enclose being attached to said support (8) by means of laterally extending ribs which cooperatively engage said support (8).

27. The assembly of claim 26, further including means to permit access to said water meter through said enclosure means.

* * * * *